United States Patent
Faucheux et al.

(10) Patent No.: US 7,858,262 B2
(45) Date of Patent: Dec. 28, 2010

(54) FUEL CELL COMPRISING A PLURALITY OF INDIVIDUAL CELLS CONNECTED IN SERIES BY CURRENT COLLECTORS

(75) Inventors: Vincent Faucheux, Lans en Vercors (FR); Frédéric Gaillard, Voiron (FR); Karine Lambert, Saint Julien de Ratz (FR); Jean-Yves Laurent, Domène (FR)

(73) Assignee: Commissariat à l'Energie Atomique, Paris (FR)

(*) Notice: Subject to any disclaimer, the term of this patent is extended or adjusted under 35 U.S.C. 154(b) by 123 days.

(21) Appl. No.: 12/289,685

(22) Filed: Oct. 31, 2008

(65) Prior Publication Data
US 2009/0123803 A1 May 14, 2009

(30) Foreign Application Priority Data
Nov. 13, 2007 (FR) .................................. 07 07974

(51) Int. Cl.
 *H01M 4/66* (2006.01)
 *H01M 8/10* (2006.01)
 *B05D 5/12* (2006.01)
(52) U.S. Cl. ............... 429/519; 429/479; 429/520; 429/535; 427/115
(58) Field of Classification Search ............ 429/30, 429/34, 13, 33, 115, 32, 158, 519, 535; 427/115
See application file for complete search history.

(56) References Cited

U.S. PATENT DOCUMENTS

| 3,525,646 | A | * | 8/1970 | Tannenberger et al. ....... 429/31 |
| 5,861,221 | A |   | 1/1999 | Ledjeff et al. |
| 5,863,672 | A |   | 1/1999 | Ledjeff et al. |
| 2001/0051293 | A1 |   | 12/2001 | Narayanan et al. |
| 2003/0211354 | A1 | * | 11/2003 | Subramanian et al. ....... 428/633 |
| 2006/0228605 | A1 |   | 10/2006 | Mosdale |
| 2008/0233454 | A1 |   | 9/2008 | Capron et al. |

FOREIGN PATENT DOCUMENTS

JP   A-61-121265   6/1986

(Continued)

OTHER PUBLICATIONS

Gilles, A., "The Pressure is on for Ceramics", Forbes.com, Mar. 7, 2008.*

(Continued)

*Primary Examiner*—Jonathan Crepeau
*Assistant Examiner*—Kenneth Douyette
(74) *Attorney, Agent, or Firm*—Oliff & Berridge, PLC

(57) ABSTRACT

Adjacent individual cells of a fuel cell are connected in series by intermediate connecting parts. Each connecting part is formed by a branch made from an electrically conducting material and extending the first current collector of a cell perpendicularly and connected to the second current collector of the adjacent cell. Each first current collector is moreover formed by an electrically insulating porous matrix incorporating said electrically conducting material, and the first current collectors of two adjacent cells are separated by an area of electrically insulating porous material, said electrically insulating porous material being identical to that forming the porous matrix of said first current collectors. Series connection between the individual cells of such a fuel cell is thereby easy and quick to implement.

13 Claims, 3 Drawing Sheets

FOREIGN PATENT DOCUMENTS

| | | |
|---|---|---|
| JP | A-10-335592 | 12/1998 |
| WO | WO 2006/069031 A2 | 6/2006 |
| WO | WO 2007/020242 A1 | 2/2007 |

OTHER PUBLICATIONS

AC Environmental Services Product Data Sheet, "Super Absorbent Polymers, Granules & Particular Sorbent Products".*

Dzhafarov et al., "Nano-Porous Silicon for Gas Sensor and Fuel Cell Applications", Journal of Qafqaz University, No. 25 (2009).*

Frey et al., "Preparation of Direct Methanol Fuel Cells by Defined Multilayer Structures", *Journal of The Electrochemical Society*, vol. 152, No. 3, 2005, pp. A545-551.

Wainright et al., "Microfabricated fuel cells", *Electrochimica Acta*, vol. 48, 2003 pp. 2869-2877.

* cited by examiner

FUEL CELL COMPRISING A PLURALITY OF INDIVIDUAL CELLS CONNECTED IN SERIES BY CURRENT COLLECTORS

BACKGROUND OF THE INVENTION

The invention relates to a fuel cell comprising a porous support whereon a plurality of adjacent individual cells are arranged, each comprising:
- an assembly formed by a first electrode, an electrolytic membrane and a second electrode,
- and first and second current collectors, said individual cells being connected in series by connecting elements respectively arranged between two adjacent cells to connect the first current collector of one cell to the second current collector of the adjacent cell.

The invention also relates to a method for producing such a fuel cell.

STATE OF THE ART

The voltage delivered by a unitary fuel cell, i.e. a fuel cell comprising a single individual cell made up of an Electrode-Membrane-Electrode assembly (or EME assembly) with associated current collectors, is in general not sufficient for use in the field of portable devices. Certain applications liable to use fuel cells as energy source do in fact require high voltages, for example of more than a few volts. For this, a fuel cell comprising a plurality of individual cells connected in series has to be used, the anode of one individual cell being connected to the cathode of the adjacent cell.

In conventional manner, the individual cells are produced separately before being associated in series with one another. In the case of fuel cells produced in the form of thin layers on a flat support (cells also called planar cells), the EME assemblies are in general produced separately on flat supports, cut out one by one and then associated in series with one another. Such a manufacturing method is long and requires the addition of current collectors soldered or bonded to the anodes and cathodes of the assemblies to enable series connection of the cells.

In the article "Microfabricated fuel cells" (Electrochimica Acta 48 (2003) 2869-2877), J. S. Wainright et al. propose a fuel cell comprising a plurality of cells connected in series, formed on a porous nylon film arranged on alumina wherein channels have been drilled. The anodic current collectors are formed by deposition by ink printing. Non-porous polymer seals are further placed between the anodic current collectors, and the rest of the cells are then produced. Series connection of the cells is achieved by conducting ink printing. However, with this solution, the electrolytic membranes swell and separate from the substrate in a humid atmosphere (100% RH). This separation results in leaks and the cell ceases to function. The low mechanical strength of the membranes is linked on the one hand to a poor contact between the insulating seals and the anodic collectors, thereby giving rise to spaces, and on the other hand to poor adhesion of the electrolytic membranes on insulating seals.

U.S. Pat. No. 5,863,672 describes a different fuel cell geometry whereby the unit voltage can be artificially increased. As illustrated in FIG. 1, such a cell 1 is made up of several individual cells 2 arranged side by side. Each cell 2 comprises an assembly of an anode 3 and cathode 4 arranged between an electrolytic membrane 5. Cells 2 are separated from one another by electrically insulating areas 6 and are connected to one another by electrically conducting connecting parts 7. Connecting parts 7 each comprise a central area 8 comprising first and second surfaces 8a and 8b respectively covered by first and second layers 9 and 10 each comprising an end in contact respectively with anode 4 of a first cell and with cathode 6 of the cell adjacent to said first cell. Such a cell, and in particular connecting parts 7, are difficult to implement, in particular on a small scale. It also requires an assembly step of the set formed by the cells placed in series between several other elements, such as external current collectors and gas distributing plates arranged on each side of said assembly. Finally, leak-tightness problems remain.

US Patent application 2006/0228605 proposes another solution. In this patent application, an electrolytic membrane is formed by impregnating a porous support with an ion conducting material. The porous support is a fabric whose chain fibers are continuous fibers made from electrically insulating material and the weft fibers are alternately electrically insulating material fibers and electrically conducting material fibers, thereby respectively forming insulating areas and conducting areas. A seal is fitted on the periphery of the fabric and the anodes and cathodes are arranged on each side of the membrane formed in this way. A current collector is also placed in contact with the anode arranged at one of the two ends of the cell and another current collector is placed in contact with the cathode arranged at the other end of the cell. The electrically active areas of the porous support delineate a plurality of individual cells and thereby perform series connection of the latter.

This solution enables fuel leaks to be prevented as the porous support is fully impregnated with ion conducting material. However, the membrane formed in this way has to present a minimal thickness to ensure the mechanical strength of the assembly. This thickness is about 20 micrometers. To increase the power densities however, the membranes have to present as small a thickness as possible, preferably between 1 and 10 micrometers. Moreover, the fibers used to form the porous support occupy a certain volume which hampers proton diffusion through the electrolyte. The surface of an electrically conducting area, generally larger than 2 mm, does in fact constitute a non-negligible surface that is unusable for proton diffusion. Finally, the insulating fibers and conducting fibers are respectively continually insulating and continually conducting, so that series connection of the cells can only be performed on a single line.

All of the existing solutions for series connection of individual cells, without having recourse to cutting and bonding of said cells, are confronted with problems of mechanical strength:
- either at the level of the electrolytic membrane that separates from the substrate,
- or at the level of the EME assemblies, and more particularly of the membrane, which must have a too high minimal thickness to be compatible with high power densities.

Moreover, for a given cell surface, the latter is shared between the surface occupied by the assembly of individual cells ("active surface") and the surface occupied by the insulating areas and/or conducting areas ("inactive surface"). However, in the solutions proposed above, the proportion of the "active surface" is relatively small and this proportion is all the smaller the greater the number of cells, which proves to be incompatible for applications having the purpose of supplying portable devices.

OBJECT OF THE INVENTION

The object of the invention is to provide a fuel cell and a method for producing a fuel cell remedying the shortcomings of the prior art.

More particularly, it is an object of the invention to provide a fuel cell that is able to attain high voltages and in particular voltages compatible with applications involving power supply of portable devices, while at the same time being easy to produce and presenting a good mechanical strength and a good leak-tightness.

It is a further object of the invention to propose a production method that is easy to implement to obtain a fuel cell able to attain high voltages and in particular voltages compatible with applications involving power supply of portable devices, while at the same time being easy to produce and presenting a good mechanical strength and a good leak-tightness.

According to the invention, these objects are achieved by the appended claims.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

A fuel cell according to the invention comprises a plurality of adjacent individual cells connected in series by connecting parts. The cell is advantageously a planar fuel cell.

Figure 1:
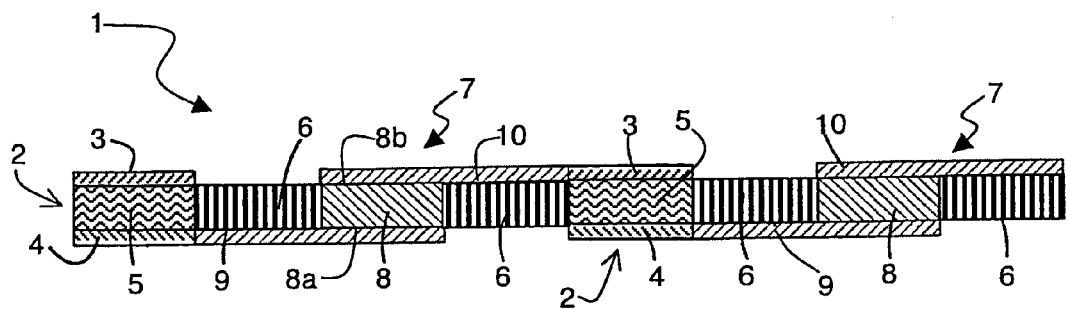
FIG. 1 represents a fuel cell according to the prior art.
Figure 2:
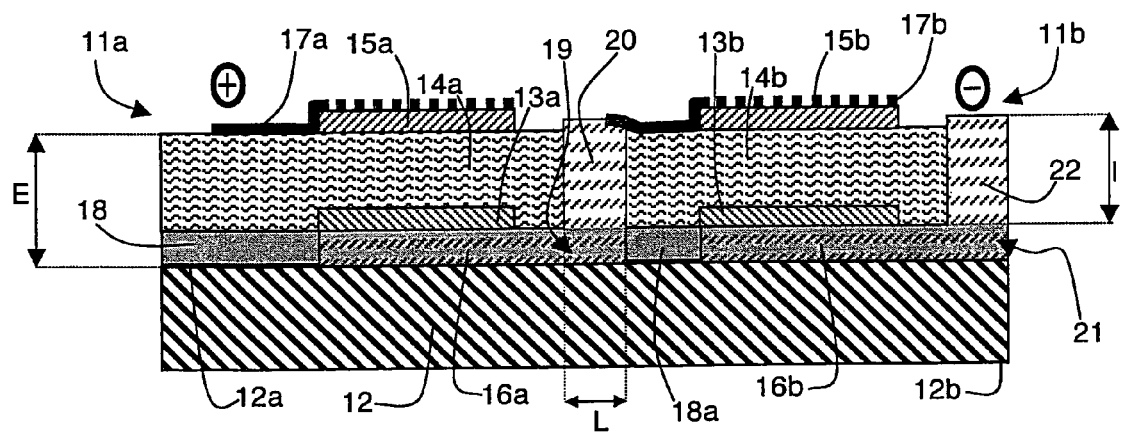
FIG. 2 represents a particular embodiment of a fuel cell according to the invention, schematically and in cross section.

In a particular embodiment illustrated in FIG. 2, two individual cells are arranged side by side on a porous support 12 presenting preferably flat top and bottom surfaces 12a and 12b.

Porous support 12 is for example formed by a porous material. It can also be formed by a non-porous material wherein channels are drilled. The porosity of the porous material or the size of the channels drilled in the non-porous material is moreover sufficient to enable diffusion of the fluids circulating the fuel cell and in particular of the combustible fluid. Porous support 12 is further electrically insulated and advantageously has a thickness comprised between 0.1 mm and 2 mm. It is for example formed by a material chosen from ceramics, polymers, silicon and silicon carbide.

The two cells are respectively referenced 11a and 11b in FIG. 2, cell 11a being the cell arranged on the left in FIG. 2 (also called first cell) and cell 11b being arranged to the right of FIG. 2 (also called second cell). Furthermore, in a general manner, in the remainder of the description the references followed by the letter "a" apply to the elements constituting cell 11a represented in FIG. 2, whereas the references followed by the letter "b" apply to the elements constituting cell 11b.

For the sake of clarity, when the description applies to either one of the two cells 11a and 11b and to the elements constituting same, the indexes "a" and "b" will be omitted. Thus for example, cells 11a and 11b and any additional cell will be referenced 11.

Each individual cell 11 comprises:
an assembly formed by a first electrode 13, for example an anode, an advantageously solid electrolytic membrane 14 and a second electrode 15, for example a cathode,
and first and second current collectors 16 and 17, respectively associated with first and second electrodes 13 and 15.

More particularly, for each individual cell 11, first current collector 16 of said cell 11 covers a part of top surface 12a of porous support 12. First collector 16 is surrounded by electrically insulating areas 18 preferably having a thickness equal to that of first current collectors 16. First-electrode 13 covers a part of first current collector 16 that is associated therewith and electrolytic membrane 14 is arranged on the assembly. Electrolytic membrane 14 thereby covers, in its bottom part:
a first electrode 13,
the part of first current collector 16 not covered by first electrode 13,
and insulating areas 18 surrounding first current collector 16.

Second electrode 15 and second current collector 17 are further arranged on the top part of electrolytic membrane 14 of each cell 11. Thus, in FIG. 2, second electrode 15 is arranged on electrolytic membrane, whereas second current collector 17 is arranged partly on electrolytic membrane 14 and partly on second electrode 15. Second electrode is further arranged facing first electrode 14 and is separated from first electrode 14 by electrolytic membrane 14.

The two adjacent individual cells 11a and 11b are further connected in series by means of a connecting part made of electrically conducting material. The connecting part is arranged between the two adjacent cells 11a and 11b. It performs connection of first cell 11a to second cell 11b, via the current collectors, which second cell 11b is adjacent to first cell 11a.

The connecting part, along with first current collector 16, forms part of a connecting element 19 having a reverse L-shape with respect to a line perpendicular to support 12 (vertical line in FIG. 2).

Connecting element 19 is formed by two parts each comprising a common electrically conducting material.

The first part is a base thin film arranged on top surface 12a of porous support 12 and constituting first current collector 16a of first cell 11a. The base thin film is a porous film enabling diffusion of the fuel through first current collector 16a and incorporating an electrically conducting material.

The second part is a branch 20 perpendicularly extending first current collector 16a and forming the connecting part. Branch 20 is formed by the same material as the electrically conducting material incorporated in the base thin film. Furthermore, if the material of branch 20 is a porous material and if electrolytic membrane 14 is formed by drying of an ion conducting material deposited in liquid form, the ion conducting material can penetrate into the pores of branch 20 so as to form a continuous electrolytic membrane from one cell 11a to another adjacent cell 11b, which enhances the mechanical strength of membrane 14.

Branch 20 of connecting element 19 preferably has a length l that is greater than or equal to thickness E of the stacks respectively formed by first current collector 16a or 16b, first electrode 13a or 13b and electrolytic membrane 14a or 14b of first and second cells 11a and 11b. The length l of branch 20 is for example comprised between 1 µm and 60 µm, whereas the width L of branch 20 can be comprised between 1 µm and 2 mm. In FIG. 2, a part of branch 20 emerges from the two assemblies and can be connected to second current collector 17b of second cell 11b. Moreover, second current collector 17b is directly in contact with branch 20 of connecting element 19. Branch 20 could however be connected to second current collector 17b by other means such as a conducting wire. Branch 20 is moreover in contact with electrolytic membrane 14a and 14b of the two assemblies of adjacent cells 11a and 11b over the whole thickness of said membrane. Branch 20 is therefore never in contact with one of the electrodes of the two assemblies. Moreover, it is never in contact with second current collector 17a of first cell 11a. The first two current collectors 16a and 16b of the two adjacent cells 11a and 11b are further separated by one of the insulating areas 18 (area noted 18a in FIG. 2).

By means of base thin film 16a, connecting element 19 thereby performs the function of current collector for first cell 11a and enables series connection of said cell 11a with the adjacent cell, second cell 11b in FIG. 2, by means of branch 20.

In FIG. 2, the fuel cell also comprises an additional connecting element 21 having an identical structure to that of connecting element 19. The base film of said connecting element 21 is formed by first current collector 16b of second cell 11b, which is extended perpendicularly by a branch (or connecting element) 22 having a length l that is greater than or equal to the thickness E.

Branch 22 of additional connecting element 21 can be used to connect first current collector 16b of second cell 11b with second current collector of an adjacent additional cell (not shown in FIG. 2).

Branch 22 can also be connected to one of the two terminals of the fuel cell, as illustrated in FIG. 2, if second cell 11b happens to be an end individual cell, i.e. one of the cells located at one end of the chain of individual cells forming the fuel cell. If first current collectors 16a and 16b are advantageously anodic current collectors, branch 22 is connected to the negative terminal of the cell, as represented in FIG. 2. In this case, additional connecting element 21 is called end connecting element.

In the same way, second collector 17a of first cell 11a can be connected to the first current collector of another adjacent cell (not shown in FIG. 2) by means of another connecting element. Second collector 17a can also, as illustrated in FIG. 2, be connected to the other terminal of the cell (positive terminal in FIG. 2), if first cell 11a is one of the end individual cells.

The electrically conducting material constituting connecting elements (or branches) 20 and 22 and incorporated in first current collectors 16a, 16b is for example chosen from a metal, carbon and a material such as a conducting ink comprising metallic particles or carbon nanotubes, and a mixture thereof.

The first current collectors constituted by porous base thin films 16a, 16b are formed by an electrically insulating porous matrix, such as a ceramic, a polymer, silicon or silicon carbide, wherein the electrically conducting material is incorporated. They can thereby be produced by impregnating a paste (for example by screen printing) or an ink (for example by ink jet printing, by a micro-dispensing system, by spray coating) containing metallic particles such as gold, stainless steel, copper, aluminum or carbon particles or a mixture thereof. They can also be produced by physical vapor deposition (PVD) or chemical vapor deposition (CVD) or any other derived techniques. Furthermore, the first current collectors being porous, this porosity can be obtained directly by formation of the base thin films or after a step of drying or burning polymer, carbon, etc, for example by local heating, for example application of a laser beam or infrared radiation or by heat treatment in a furnace or by local combustion.

Insulating areas 18, arranged on porous support 12 and surrounding first current collectors 16a and 16b, are formed from an electrically insulating porous material also used in the composition of first current collectors 16a and 16b. The thickness of insulating areas 18 is advantageously comprised between 0.1 µm and 40 µm. They can further be achieved by techniques used in the ceramics field (screen printing, strip casting, etc.) or the plastics processing or microelectronics fields.

Such a fuel cell is advantageously produced by fabricating connecting elements 19, 21 separated from one another by areas 18a before producing the assemblies of individual cells 11a, 11b and second current collectors 17a, 17b of the cell. Connecting elements 19, 21 are in particular produced:

by forming the first current collectors, on porous support 12, separated by areas 18, 18a, and by forming branches 20, 22 perpendicularly extending said thin films, said branches being formed from the same electrically conducting material.

Insulating areas 18 and current collectors 16a and 16b can thus advantageously be produced from deposition of a single thin layer. This enables current collectors 16 and insulating areas 18 of the same thickness to be obtained, without any free space between the two, thereby preventing fuel leakage problems.

Figure 3:
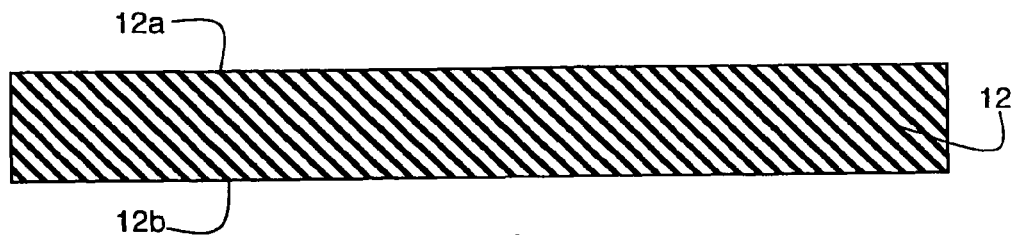
FIGS. 3 to 5 represent different steps of a first method for producing the fuel cell according to FIG. 2, schematically and in cross section.
Figure 4:
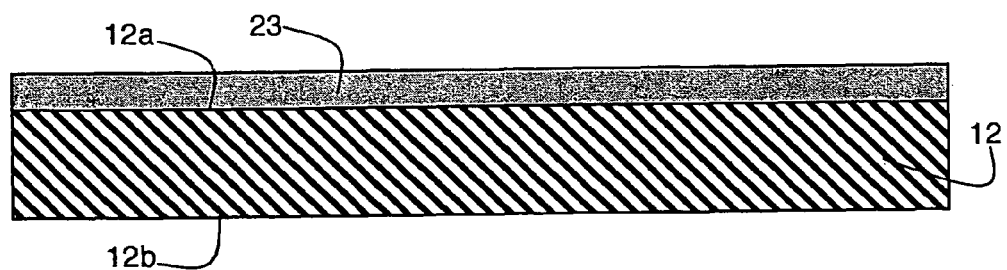
Figure 5:
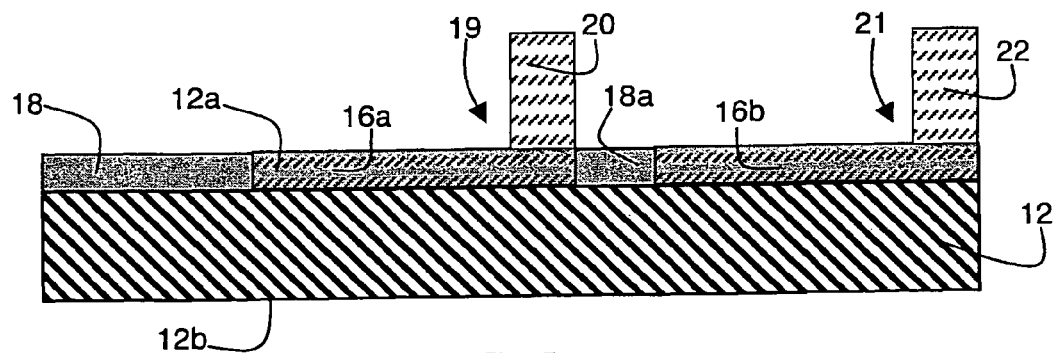
Figure 6:
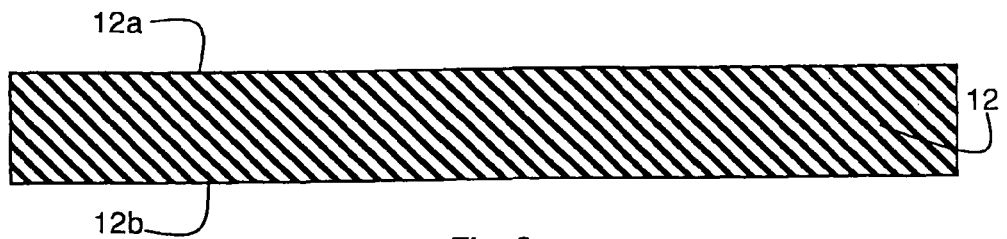
FIGS. 6 to 9 represent different steps of a second method for producing the fuel cell according to FIG. 2, schematically and in cross section.
Figure 7:
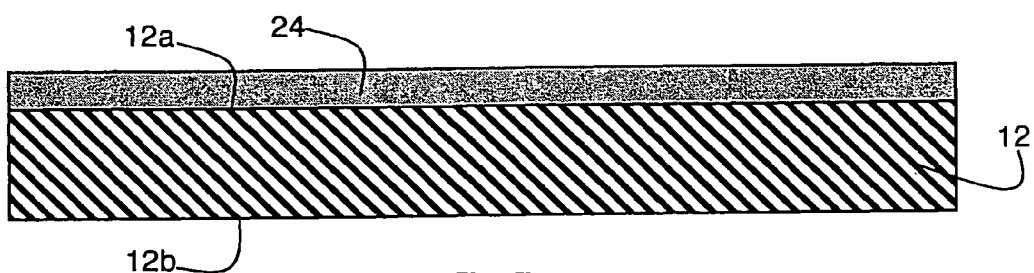
Figure 8:
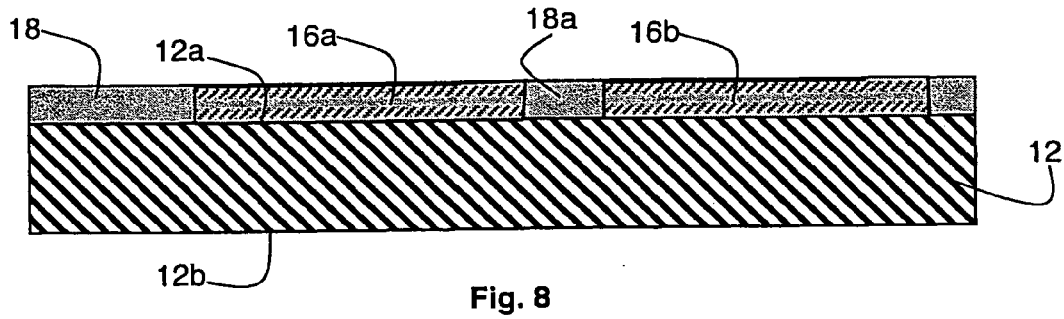
Figure 9:
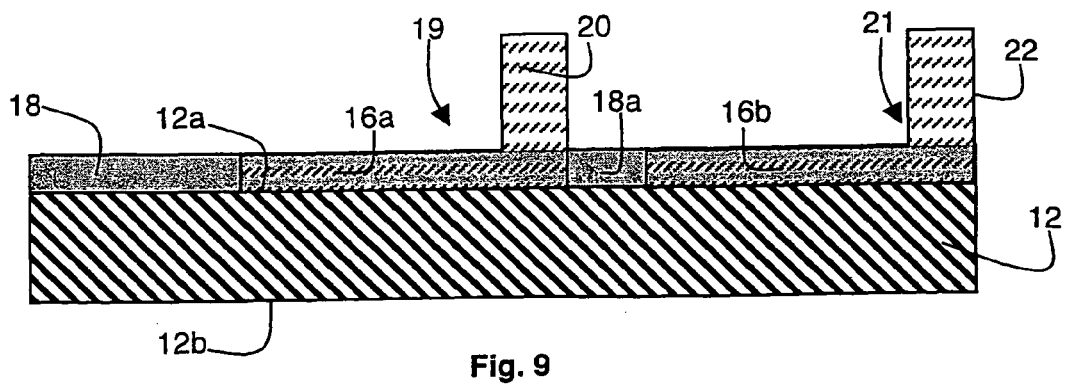

FIGS. 3 to 5 illustrate for example the first steps of a particular embodiment of such a fuel cell. A thin layer 23 of electrically insulating porous material is deposited on the whole of top surface 12a of porous support 12 (FIG. 4). Then an electrically conducting material is selectively introduced or incorporated in predefined parts of thin layer 23 to form first current collectors 16a and 16b, as represented in FIG. 5. As represented in FIG. 5, branches 20 and 22 can advantageously be formed at the same time as first current collectors 16a and 16b in so far as they are formed by the same material as that incorporated in the predefined parts of thin layer 23. Branches 20 and 22 can also be formed after formation of first current collectors 16a and 16b, for example by locally depositing the same material as that incorporated in the parts of thin layer 23 designed to form first current collectors 16a and 16b. Branches 20 and 22 can for example be produced by screen printing, by ink jet. Then the assemblies of cells 11a and 11b and second current collectors 17a and 17b are formed.

The production method is thereby easier and quicker to implement, as series connection between all the individual cells of a fuel cell can be performed in a single operation.

For example, thin layer 23 is produced by depositing a thin layer of porous insulating ceramic by screen printing, on the whole top surface 12a of porous support 12. A conducting ink is then selectively introduced by impregnation in the parts of thin layer 23 designed to form current collectors 16a and 16b. A drying step then enables current collectors 16a and 16b and insulating areas 18 to be obtained. Impregnation of thin layer 23 by a conducting ink can be performed over the whole thickness thereof or only in a top part of thin layer 23 or beyond thin layer 23, so as to impregnate porous support 12 as well. Branches 20 and 22 are then produced from this same ink deposited for example by screen printing.

In an alternative embodiment represented in FIGS. 6 to 9, thin layer 23 of electrically insulating material can be replaced by a thin layer 24 formed by an electrically insulating porous matrix wherein an electrically conducting material is incorporated. In this case, the deposition step of layer 24 is followed by a step of selective elimination of the electrically conducting material in predefined parts of layer 24 corresponding to the required insulating areas 18. If the electrically conducting material is carbon-based, it can be selectively eliminated by localized heating, for example by application of a laser beam or an infrared beam, or by combustion enabling the carbon-based electrically conducting material to be burnt locally. Branches 20 and 22 are in particular formed after first current collectors 16a and 16b have been formed (FIG. 5). Formation of connecting elements 19 and 21 separated by one of insulating areas 18 is then followed by formation of the assemblies of cells and of the second current collectors.

A fuel cell according to the invention thereby presents the advantage of being easy and quick to implement, while at the same time enabling high power densities to be achieved and preserving a good mechanical strength, a good leak-tightness and a large "active surface".

Series connection of the individual cells with connecting elements such as those represented in FIG. 2 enables the ohmic losses linked with the contact resistances to be reduced in the case of applications requiring high current densities (>300 mA/cm$^2$). In the case of series connection of the individual cells by cutting of the cells and bonding of the current collectors, contact resistance measurements between the anodic collector of one cell and the cathodic collector of the adjacent cell indicate values of 0.1 Ohm. Consequently, the Joule effect losses are about 0.1 W at 300 mA and 1 W at 1 A in the case of an association of 10 cells. The use of connecting elements 20 and 22 between the respectively anodic current collectors 16 and cathodic current collectors 17 of adjacent cells does however enable the Joule effect losses to be considerably reduced, as the current is distributed over a larger surface.

Moreover, the use of a porous support providing the mechanical strength means that electrolytic membranes of very small thicknesses can be produced, enabling high power densities to be obtained and Joule effect losses to be reduced.

Furthermore, the advantageous use of a material common to the insulating areas and to the connecting elements ensures a continuity between these two elements (same height, no offset or overlap), which reduces leakage risks.

Finally, the small width of the branches (or connecting elements), associated with the fact that the support does not require any additional strengtheners around the cells, means that the "active surface" part assigned to the cells can be increased. This enables the surface of the fuel cell to be optimized so as to obtain cells delivering a high voltage connecting a very large number of individual cells in series, while at the same time minimizing the size of the whole fuel cell.

We claim:

1. A fuel cell comprising a porous support whereon a plurality of adjacent individual cells are arranged, each individual cell of the plurality of adjacent individual cells comprising:
   an assembly formed by a first electrode, an electrolytic membrane and a second electrode,
   a first current collector associated with the first electrode, the first current collector being arranged on the porous support and formed by a base thin film consisting of: a porous matrix consisting of an electrically insulating porous material, and
      an electrically conducting material dispersed within the porous matrix, and
   a second current collector associated with the second electrode,
      wherein the plurality of adjacent individual cells are connected in series by a plurality of connecting elements respectively arranged between two adjacent individual cells of the plurality of adjacent individual cells to connect the first current collector of one individual cell to the second current collector of an adjacent individual cell,
   wherein each connecting element of the plurality of connecting elements is formed by a branch comprised of the electrically conducting material, the branch perpendicularly extending the base thin film of the first current collector of a first individual cell of the two adjacent individual cells to form a connection with the second current collector of a second adjacent individual cell of the two adjacent individuals cells,
   wherein the branch contacts the electrolytic membranes of the two adjacent individual cells over a whole thickness of the electrolytic membranes, and
   wherein an insulating area is arranged on the porous support and separates the base thin films of the two adjacent individual cells, the insulating area consisting of an electrically insulating porous material that is identical to the electrically insulating porous material of the porous matrix of the base thin films.

2. The fuel cell according to claim 1, wherein the fuel cell comprises two terminals respectively connected to the first current collector of a first individual cell and to the second current collector of a second individual cell, respectively arranged at two ends of the plurality of adjacent individual cells.

3. The fuel cell according to claim 1, wherein the electrically insulating porous material of the porous matrix and the electrically insulating porous material of the insulating area are selected from the group consisting of ceramics, polymers, silicon and silicon carbide.

4. The fuel cell according to claim 1, wherein the electrically conducting material is selected from the group consisting of a metal, carbon and a material comprising metallic particles or carbon nanotubes, and mixtures thereof.

5. The fuel cell according to claim 1, wherein the base thin films of the two adjacent individual cells and the insulating area have the same thickness.

6. A method for producing a fuel cell according to claim 1, wherein formation of each of the assemblies and each of the second current collectors of the plurality of adjacent individual cells is preceded by forming the plurality of connecting elements separated by the insulating area, the forming of the plurality of connecting elements comprising:
   forming each of the first current collectors separated by the insulating area on the porous support, and
   forming the branches that perpendicularly extend from the base thin films, the branches being formed from the electrically conducting material.

7. The method for producing a fuel cell according to claim 6, wherein the branches are formed at the same time as the first current collectors.

8. The method for producing a fuel cell according to claim 6, wherein the branches are formed after the first current collectors.

9. The method for producing a fuel cell according to claim 6, wherein the forming of each of the first current collectors comprises:
- depositing a thin layer consisting of the electrically insulating porous material on the porous support, and
- selectively introducing the electrically conducting material within predefined parts of the thin layer, the predefined parts constituting the first current collectors.

10. The method for producing a fuel cell according to claim 6, wherein the forming of the first current collectors comprises:
- depositing on the porous support a thin layer consisting of:
  - the porous matrix consisting of the electrically insulating porous material, and
  - the electrically conducting material dispersed within the porous matrix, and
- selectively eliminating the electrically conducting material in predefined parts of the thin layer, the predefined parts forming the insulating area.

11. The method for producing a fuel cell according to claim 10, wherein the electrically conducting material is a carbon-based material, and the selective elimination of the electrically conducting material is achieved by localized heating of the predefined parts.

12. The fuel cell according to claim 1, wherein the electrically insulating porous material of the porous matrix, and the electrically insulating porous material of the insulating area, allow for the diffusion of fluids circulating within the fuel cell.

13. The fuel cell according to claim 1, wherein the base thin film is a single base thin film.

* * * * *